United States Patent [19]
Yamamoto

[11] 3,737,266
[45] June 5, 1973

[54] MOLD FOR PREPARING A SHAPED ARTICLE MADE OF FOAMED THERMOPLASTIC RESIN

[75] Inventor: Ken Yamamoto, Sashima-gun, Ibaragi-ken, Japan

[73] Assignee: Sekisui Kaseihin Kogyo Kabushiki Kaisha, Nara-shi, Japan

[22] Filed: Jan. 11, 1971

[21] Appl. No.: 105,278

[30] Foreign Application Priority Data
Jan. 21, 1970 Japan .................................. 45/5850

[52] U.S. Cl. .................. 425/141, 249/113, 249/134, 425/812, 425/817
[51] Int. Cl. .............................................. B29c 1/14
[58] Field of Search ...................... 18/DIG. 62, 34 R, 18/47 R; 249/113, 134, 141, 117; 425/812, 817

[56] References Cited
UNITED STATES PATENTS
| | | | |
|---|---|---|---|
| 3,015,851 | 1/1962 | Wiles | 18/DIG. 62 |
| 3,474,498 | 10/1969 | Hoppes | 18/DIG. 62 |
| 3,427,689 | 2/1969 | Windecker | 18/47 R |
| 3,262,159 | 7/1966 | Falkenau et al. | 18/47 R |

Primary Examiner—H. A. Kilby, Jr.
Attorney—James E. Armstrong and Ronald S. Cornell

[57] ABSTRACT

A novel non-metallic double-walled mold for the molding of foamable thermoplastic resin by dielectric heating is provided. The mold is constructed by a special method to provide a thin uniform inner wall spaced apart from the outer wall, but supported by the outer wall to prevent deformation by the force exerted by the foamable resin during expansion. Using the mold, smooth-surfaced foamed articles which conform to the contours of the mold are produced.

8 Claims, 5 Drawing Figures

MOLD FOR PREPARING A SHAPED ARTICLE MADE OF FOAMED THERMOPLASTIC RESIN

BACKGROUND OF THE INVENTION

Shaped articles of foamed thermoplastic resin are made by placing foamable resin particles or beads into a mold and causing the particles to foam up in the mold. The foamable particles heretofore used for this purpose include homopolymers or copolymers of styrene or methyl methacrylate which contain volatile hydrocarbons, such as propane, butane and pentane. When such foamable particles are used ordinarily they are first separately pre-expanded to form prefoamed discrete particles. The prefoamed particles are then placed in a mold and reheated, causing the particles to expand and to unite, whereby a foamed shaped article is obtained.

The molds commonly used for this purpose are made from metal. Such molds are closable and have walls perforated with a number of small holes, through which gas generated during expansion of the resin as well as steam can pass in or out of the mold. The holes are, however, small enough to prevent the passage of softened resin. Steam has been normally used as a heating medium and it is blown into the mold through the holes or perforations in the wall. This method has the advantage that a shaped article can be made using a simple apparatus; however, the method is not good in heat efficiency and also requires a comparatively long time to make a shaped article.

In order to overcome these drawbacks, it has been proposed to heat the foamable particles dielectrically with high frequency electromagnetic waves. The dielectric heating method seems to be theoretically ideal because, according to this method, the resin is heated from its interior. Actually, however, a shaped article thus made lacks a smooth surface and a shape truly conforming to that of the mold, because the resin close to the surface of the article does not come to close contact with the surface of the mold wall. The reasons for this are not clearly understood; however, presumably the problem is caused by a sudden cooling of the resin when the resin is foamed up and comes into contact with the mold wall surface, because the wall surface is not heated to a temperature as high as that of the resin.

In conventional molding of foamable thermoplastic resin it has been known to use a mold having double walls. In such molds steam is used as a heating medium and is directly blown into the mold, thereby heating the particles charged to the mold, as well as the mold walls. However, these molds are made of metal and cannot be used in dielectric heating. Double-walled molds have not been used for dielectric heating molding processes, because the concept of dielectric heating is that the resin only is heated from its own inner portion and the function of the mold is simply to contain and shape the resin.

Thus, when high frequency electromagnetic waves are used in making foamed articles, it has been proposed to use a mold having an inner surface provided with a thin layer of high polymer material having a relatively high power loss factor for high frequency waves. For example, Japanese Utility model, Gazette Sho 41-465, describes placing a high polymer layer at the inner wall of a mold. However, when foamable polystyrene particles are used as a raw material in such a mold, it is still impossible to form a shaped article having a smooth surface and a shape true to that of mold. When foamable polystyrene particles, which have a low power loss factor, are placed in the mold and heated by high frequency electromagnetic waves, it is necessary that water be added beforehand to the foamable polystyrene particles; thus, the water is at first heated by the high frequency electromagnetic waves and then the polystyrene particles are heated by the water, because the polystyrene particles are transparent to the high frequency waves. However, when an inner wall of the mold is made of high loss factor material, the inner wall is heated by the high frequency waves before the particles in the mold are heated and, accordingly, the procedure in effect loses the characteristics of a high frequency method. For this reason, methods for manufacturing shaped articles by means of high frequency have, in fact, never been commercially successful, in spite of the fact that heating by such means has been thought to be therotically ideal.

In the present invention the drawbacks associated with high frequency or dielectric heating are solved by a novel non-metallic double-walled mold, which can be used to produce foamed articles having a smooth surface and shape true to the mold.

SUMMARY

According to the present invention an improved mold is provided for making shaped articles of foamed thermoplastic resin by means of high frequency electromagnetic waves. The mold is closable and is constructed by uniting an inner wall and an outer wall, between the two walls a space or spaces being provided to permit fluid to pass therethrough. The inner wall has a number of minute holes or perforations which permit the passage of water or air but do not allow the passage of resin. The space or spaces communicate with the cavity of the mold via the minute holes, and the outer wall is provided with at least one aperture or vent communicating with each of said spaces. The walls of the mold are made of non-metallic material having low power loss factor for high frequency electromagnetic waves. The inner wall is made uniform and as thin as possible; the minimum thickness being such that the wall is not measurably deformed by the force exerted by the resin during expansion. The outer wall is thick and tough and the inner wall is supported by the outer wall by sporadic protrusions or supports distributed through the space or spaces.

DETAILED DESCRIPTION

Figure 1:
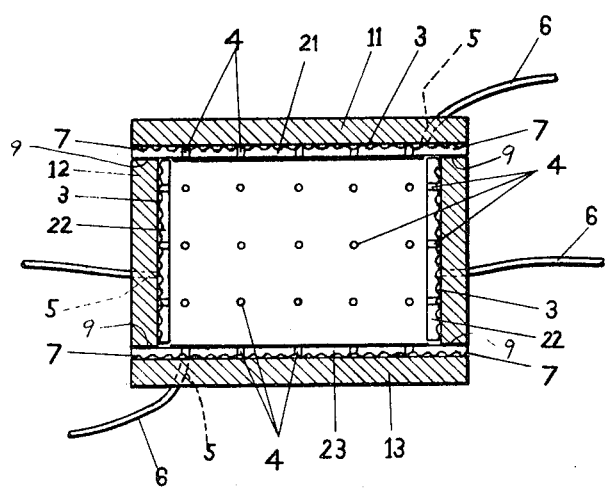

The mold of the present invention is constructed of a material having low power loss factor for high frequency electromagnetic waves; that is a material having loss factor less than 0.05. Such materials include, for example, polyester resins reinforced by glass fibers, epoxy-resins, dried wood, glass, quartz, ceramics, polymethacrylates, Teflon and silicone-impregnated glass fibers.

The mold is constructed of two-part walls, an inner wall part and an outer wall part, one of which parts, the inner wall must be thin. In general, the thickness of the inner wall ranges from 0.5 mm to 10 mm, and is less than the thickness of the outer wall. If the thickness of the inner wall is more than 10 mm, it has a high heat capacity and, accordingly, is difficult to heat in a short period of time up to the temperature of the resin contained in the mold. Therefore, the thickness of the inner wall must be less than 10 mm. Conversely, if the thickness of the inner wall is less than 0.5 mm, the inner wall is deformed by the foamable resin during expansion in the mold. Therefore, the thickness of the inner wall must be more than 0.5 mm. Within these ranges the thickness of the inner wall should be determined by taking into account the total surface area and the selected material of construction so that the inner wall should not be measurably deformed by the force exerted by the foamable resin and should be heated in a be time up to the softening point of the foamable resin. For example, when the inner wall is made of polyester resin reinforced by glass fibers and has a surface area of about 25 square centimeters, an inner wall having 1.0 to 5.0 mm in thickness will suffice. In general, the inner wall preferably is of uniform thickness throughout. In contrast, the outer wall of mold must be tough and, therefore, must have ample thickness. The outer wall may be of uneven thickness, because performance is not affected by differences in thickness of individual portions of the outer wall.

The mold requires a predetermined space between the inner and outer walls. The width of the space is preferably small; more particularly it is equal to or less than the thickness of the inner wall. In an extreme case, the inner wall may come into slight contact with the outer wall, if one of opposing surfaces of either wall is roughened by rasping. Thus, the minimum space between the inner and outer wall is a gap resulting from the incipient contact of two surfaces provided that one of the surfaces is irregular or jagged. It is necessary for the space to be of sufficient width to permit the passage of fluid.

In order to prevent deformation of the thin inner wall of the mold, the mold is provided with sporadic supports in the space between the inner and outer wall; such supports or crosspieces connecting the inner wall with the outer wall, thereby supporting the inner wall by the strength of the outer wall. Conveniently, if a rough surface made by rasping one of the opposing wall surfaces is in incipient contact with the opposing surface, protruding portions formed on the rough surface serve as supports between the inner and outer wall.

In the mold, a number of minute holes or perforations ranging from 0.5–5 mm in diameter are distributed over the entire surface of the inner wall, and at least one vent is provided for each separate space between the inner wall and the outer wall. Thus, the minute perforations in the inner wall permit steam or air to pass therethrough, but, do not allow softened and expanding foamed resin to escape. The perforations preferably have a diameter of 0.5–3.0 mm. As stated above, at least one vent through the outer wall is provided, so that fluid is not trapped in the space between the inner wall and outer wall. Ordinarily, plural spaces are provided in a mold to permit the mold to be closable. Thus the mold is constructed in at least two separated parts and accordingly, at least one space is formed in each separated part, and at least one vent is also required in every space. The diameter of the vent is also preferably small so that air or steam remaining in the space can escape after some pressure has been developed.

Figure 2:
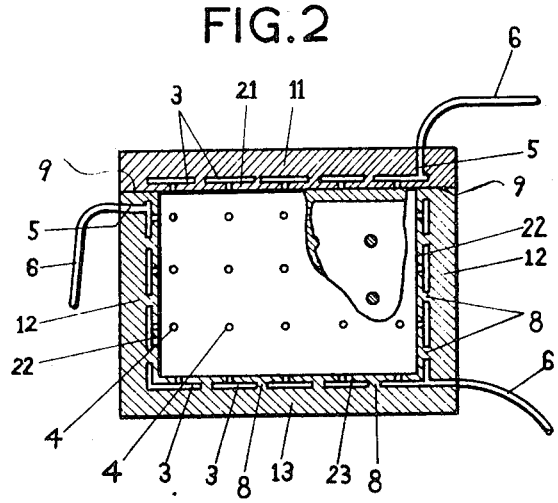

The invention is readily understood by referring to the accompanying drawings in which:

FIGS. 1 and 2 are schematical horizontal and vertical cross-sectional views respectively of embodiments of the mold.

Figure 3:
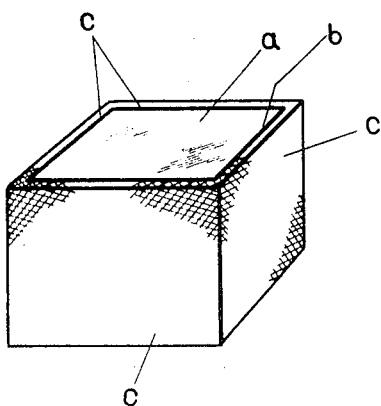
Figure 5:
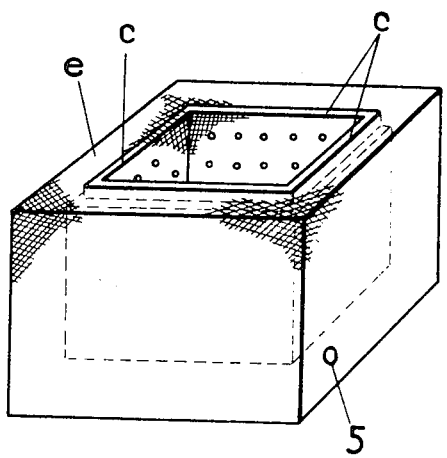
Figure 4:
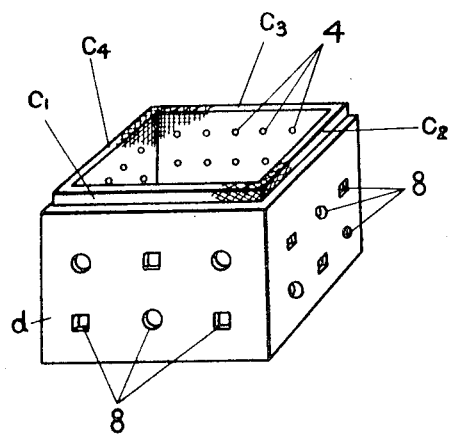

FIGS. 3 through 5 are perspective views which show a method for constructing the mold of FIG. 2; more particularly, FIG. 3 is a perspective view of a stage in which the inner wall of the mold surrounds a sample, FIG. 4 is a perspective view of a stage in which a thin plate of a solid material having low melting point surrounds the inner wall of the mold and the sample is removed, and FIG. 5 is a perspective view of a stage in which the outer wall is positioned around the thin plate of FIG. 4.

The mold shown in FIG. 1 has a cavity in the form of a rectangular parallelopiped and is constructed of three separable parts, a bottom plate, a side plate and a cover plate. Contacting portions between these plates constitute parting lines of the mold. These plates all have respective inner walls and outer walls.

In FIG. 1, outer wall 11 and inner wall 21 constitute the cover plate. Outer wall 12 and inner wall 22 constitute the side plate and outer wall 13 and inner wall 23 constitute the bottom plate. These respective inner walls and outer walls are joined to each other in peripheral portions 7 and spaces 3 are formed therebetween. Minute holes or perforations 4 extending through the inner wall 21, 22 and 23 are distributed over the entire surfaces of said walls. Vent 5 extends through the outer wall and communicates via space 3 with the interior of the mold. Tube 6, connected with vent 5, permits fluid remaining in space 3 to flow out after the fluid has developed some pressure. Tube 6 is also needed to remove steam generated in the mold from the field of high frequency electromagnetic waves because an accidental discharge sometimes results when steam is immediately discharged into a field of high frequency electromagnetic waves. In FIG. 1, numeral 9 denotes a parting line of the mold.

The mold shown in FIG. 1 can be made of polyester resin reinforced by glass fibers, except for vent 6 which is made of polyamide resin. The individual inner walls 21 and 23 are conveniently plates having an area of about 25 cm × 20 cm and a thickness of about 3 mm; thus the mold cavity is about 25 cm long, 20 cm wide and 10 cm deep. The surfaces facing space 3 are coarsely sandpapered to provide rough jaggedness. Individual inner walls are joined by polyester resin 7 to respective outer walls, the jagged surfaces of the inner walls opposing the outer walls and making incipient contact therewith.

The mold shown in FIG. 2 has, as the mold in FIG. 1, a rectangular parallelopiped cavity and is divisable into two parts, a box and a cover plate. Contacting portions between these plates constitute a parting line of the mold. In FIG. 2, outer wall 11 and inner wall 12 form a three-sided box and outer wall 12 and inner wall 22 form the cover plate. Spaces 3 are formed between the inner wall and outer wall. Minute holes or perforations 4 are provided in the inner wall. In both FIGS. 1 and 2, vent 5 is connected to tube 6 leading to the exterior of the mold. Numeral 9 denotes a parting line of the mold.

The mold of FIG. 2 differs from that of FIG. 1 in that inner walls 21 and 22 are directly connected to the respective outer walls 11 and 12 by sporadic supports 8. In the mold, inner walls 21 and 22, are not sandpapered to roughen the surface facing space 3, but instead are fixed by supports having a height of about 1 mm and a diameter of about 5 mm, the supports being positioned at intervals of 2 cm. Because of these supports, even although the mold has a thin inner wall of 3 mm in thickness, there is no deformation during the expansion of the foamed particles. The mold of the invention can be used in the same way as the conventional mold for high frequency heating. Thus expandable thermoplastic particles, such as polystyrene particles, or prefoamed particles thereof are intimately mixed with water in an amount of 10 to 30 weight % thereof. The particles thus obtained are placed in the mold, and then the mold is placed in the field of high frequency electromagnetic waves for a predetermined period of time. Conventional high frequency heating conditions, such as those described in Edberg et al. patents, U.S. Pat. No. 2,998,501 and U.S. Pat. No. 3,242,238, are used. In order to evenly distribute the water on the surfaces of the polystyrene particles, a surface active agent may be added and dissolved in the water, and in order to improve the heat efficiency by high frequency electromagnetic waves, an electrolyte such as sodium chloride may be added and dissolved in the water, as in conventional methods.

The mold of invention (as shown in FIG. 2) is made by a novel construction method. The novel method solves the problem of how to provide spaces of the proper dimension between outer wall and the inner wall of the mold; in particular, the problem of how to form supports to connect the inner wall with the outer wall in the spaces between the two walls. According to the method of the invention, a solid material having low melting point is at first positioned in the space or spaces to be formed between the inner wall and outer wall, and thereafter the solid material is rendered molten and removed or allowed to flow out after the inner wall and outer wall have been formed.

A non-metallic material having low loss factor for high frequency electromagnetic waves is used as the construction material for the mold. A shaped sample or mold pattern and a solid space-forming material are also provided. The solid material is not affected by the non-metallic material and has a lower melting point than that of the non-metallic material, preferably below 100°C. A parting line for the mold is determined on said shaped sample, the non-metallic material is applied to the shaped sample such that the entire surface of the sample is covered with a substantially uniform thin layer of non-metallic material, said layer being separated along said parting line. A thin plate made of the low melting point material is formed over the entire surface of said layer with the exception of the peripheral portions of said parting line. Holes or perforations are formed at predetermined intervals in the surface of the thin plate, and additional non-metallic material is applied to the surface of the plate, the non-metallic material being applied so as to penetrate into said perforated holes and to unite with the first applied non-metallic material in the peripheral portions of said parting line. The additional non-metallic material forms the outer wall of the mold and is applied separately so that it, as well as the first applied non-metallic material, can be separated along the parting line of the mold, permitting the mold to be divided into plural parts. If the non-metallic material is one capable of hardening, such as, for example, unsaturated polyester resin, the melting point of the non-metallic material is determined after hardening.

A particular embodiment of the construction method of the invention is as follows:

A sample or mold pattern $a$ having a desired shaped, is prepared as shown in FIG. 3. The sample $a$ is made of rigid material, for example, wood or plaster. In the case of FIG. 3 the sample or mold pattern is formed in the shape of a rectangular parallelopiped. The parting line of the mold is, for example, line $b$ shown by a thick line in FIG. 3. Assuming that polyester resin reinforced by glass fibers is used as the construction material, and paraffin wax is employed as the solid material having a low melting point which is not affected by polyester resin, details of the mold construction are hereunder.

In commercially available unsaturated polyesters, maleic acid anhydride and/or phthalic acid anhydride are used as the polybasic acid and ethylene glycol and/or glycerol are used as the polyalcohol. Styrene is normally used as the monomer, which is polymerizable with the polyester. The unsaturated polyester and the prepolymer thereof can be polymerized at room temperature and under contact pressure in the presence of catalyst, such as benzoyl peroxide, if necessary by the aid of a polymerization accelerator, such as cobalt naphthenate, to form a solid resin. Such unsaturated polyesters resin are sold in the market; for example Atlac (manufactured by Atlas Powder Co.), Laminac (manufactured by American Cyanamid Co.) and Paraplex (manufactured by Rohm and Haas Co.). Any of the above mentioned polyesters can be used for the preparation of the mold of the invention.

A mat of glass fibers is immersed in a mixed solution of unsaturated polyester resin prepolymer and catalyst for hardening the same; thus a mat impregnated with the prepolymer is prepared. A plurality of mats are individually applied to five of the surfaces of the sample $a$, as shown by $c$ in FIG. 3, excluding the surface corresponding to the cover part of the sample $a$. The prepolymer is then hardened, while maintaining the thickness of glass mat as thin and as uniform as possible. The resulting glass mat-reinforced polyester resin is formed in a thickness of about 3 mm. After the prepolymer is hardened, sample $a$ is removed from the hardened polyester resin, and a number of minute holes 4 are then formed at spaced intervals of one hole in every one square centimeter over the entire surface of polyester resin. The polyester resin article thus obtained is the inner wall of the mold.

Paraffin wax is then applied to the inner wall $c$ to form a thin plate over the entire outer surface, excluding peripheral portions C1, C2, ... The thickness of the thin plate determines the width of the space between the inner wall and outer wall of the mold to be prepared. Then, the thin plate or layer is perforated to provide a plurality of holes 8 of desired shapes at spaced intervals. Conveniently, the thin plate is formed in a thickness of about 1 mm, and the diameter of holes is about 5 mm.

Thereafter, a polyester resin plate reinforced by glass fibers is further formed over the whole surface of the thin plate of paraffin wax $d$ and also on surfaces of the peripheral portions C1, C2 ... of the inner wall $c$ made of polyester resin. A plurality of the glass mats impregnated with a mixture of polyester resin prepolymer and hardening agent are applied to said surfaces, and the prepolymer is allowed to closely contact the peripheral portions C1, C2, .... and also to penetrate into the holes 8. The prepolymer is then hardened to form polyester resin plate *e* which is united with the inner wall *c*, by said peripheral portions C1, C2, . . . , as is shown in FIG. 5. After that, vent 5 is perforated in the polyester resin plate *e*. The resulting article is heated, for example, by immersing it in water at 100°C to melt the paraffin wax, and the molten paraffin wax is allowed to flow out through vent 5. Thus, a bottom mold as shown in FIG. 2 is prepared. A cover mold is also prepared in the same way, and is thereafter assembled with the bottom mold to provide the mold of the invention.

Phenol resins, epoxy resins, and mixtures of epoxy resins and polyester resins can be used instead of polyester resin as the construction material for the mold. Clay or plasticine, gelatin and plaster can also be employed in lieu of paraffin wax as the solid material having a low melting point. These latter materials are preferably used in admixture with water.

The mold, because of its low loss factor for high frequency electromagnetic waves, is not measurably affected directly by high frequency electromagnetic waves; therefore the resin contained in the mold is efficiently heated. Fluid, generated in the mold when the foamable resin is heated by high frequency electromagnetic waves, passes to spaces 3 through minute holes 4; therefore, inner walls 21, 22, 23, etc., are heated from both sides by contact with the fluid. Because the inner walls are separated from the outer walls except in the areas of the supports and because the inner walls are much thinner than the outer walls, most of the heat transmitted from the fluid is absorbed by the inner walls. Fluid, which must be discharged from the mold when the expandable resin particles are foamed up, can be discharged with ease to space 3 through the minute holes 4. Furthermore, in spite of the fact that the inner walls are thin, supports 8 serve to prevent measurable deformation of the mold cavity. For these reasons, when dielectric heating is carried out using the novel mold, a molded article having a shape truly conforming to that of the mold can be obtained. The molded article has a uniform smooth surface which is formed by close contact with all inner walls of the mold. Surface smoothness is conspicuous and clearly discernable by the fact that coalesced lines between adjacent foamed particles on the shaped article rise up to the surface of the shaped article; in other words, the coalesced lines do not sink and thus the entire surface of the shaped article contacts closely the surface of the inner wall of mold.

What is claimed is:

1. A closable mold for the dielectric heating of foamable thermoplastic particles comprising
    a. a thin inner wall of rigid non-metallic low power loss material surrounding a mold cavity, said inner wall
        1. having a plurality of minute apertures spaced at intervals over its entire surface, the size of said apertures being such as to permit the passage of fluid, but to prevent the passage of foamed thermoplastic resin particles, and
        2. being of a thickness sufficient to withstand deformation by the force exerted by the expansion of the foamable resin particles;
    b. a thick, tough outer wall of rigid non-metallic low power loss material surrounding completely said inner wall and being spaced apart therefrom, the space separating the inner and outer wall being equal to or less than the thickness of the inner wall;
    c. a plurality of supports positioned at predetermined intervals in the space separating each of the inner and outer walls, said supports serving to connect the inner and outer walls and to reinforce the thin inner wall to prevent deformation thereof; and
    d. at least one vent passing through said outer wall and connecting the space between the walls with the atmosphere.

2. A closable mold of claim 1 which is constructed of at least two separate interconnectable parts, each part comprising a spaced apart inner and outer wall, the separation of said parts forming at least two disconnected spaces separating said inner and outer walls of said mold, and at least one vent connecting each disconnected space between said walls with the atmosphere.

3. A closable mold of claim 2 wherein the diameter of said vents are restricted so that the fluid accumulating in said spaces during molding develops pressure before escaping through said vents.

4. A closable mold of claim 1 wherein said supports are formed by providing a roughened surface on one of the opposing sides of said inner and outer walls and said inner and outer walls are positioned in incipient contact, the space separating said inner and outer walls being of sufficient width to permit the passage of fluid and the irregular protrusions on said roughened surface forming said supports.

5. A closable mold of claim 1 wherein the surfaces of the opposing sides of said inner and outer walls are smooth and integral supports extending from said outer wall connect said inner and outer walls at predetermined intervals.

6. A closable mold of claim 5 wherein the diameter of said supports is approximately four to six times the width of the space separating said walls.

7. A closable mold of claim 1 wherein the rigid non-metallic low power loss factor material used for both said inner and outer walls is fiberglass-reinforced polyester resin.

8. A closable mold of claim 1 where said minute apertures have a diameter of about 0.5 to 5.0 mm and are spaced at intervals of one aperture per square cm.

* * * * *